Patented May 21, 1946

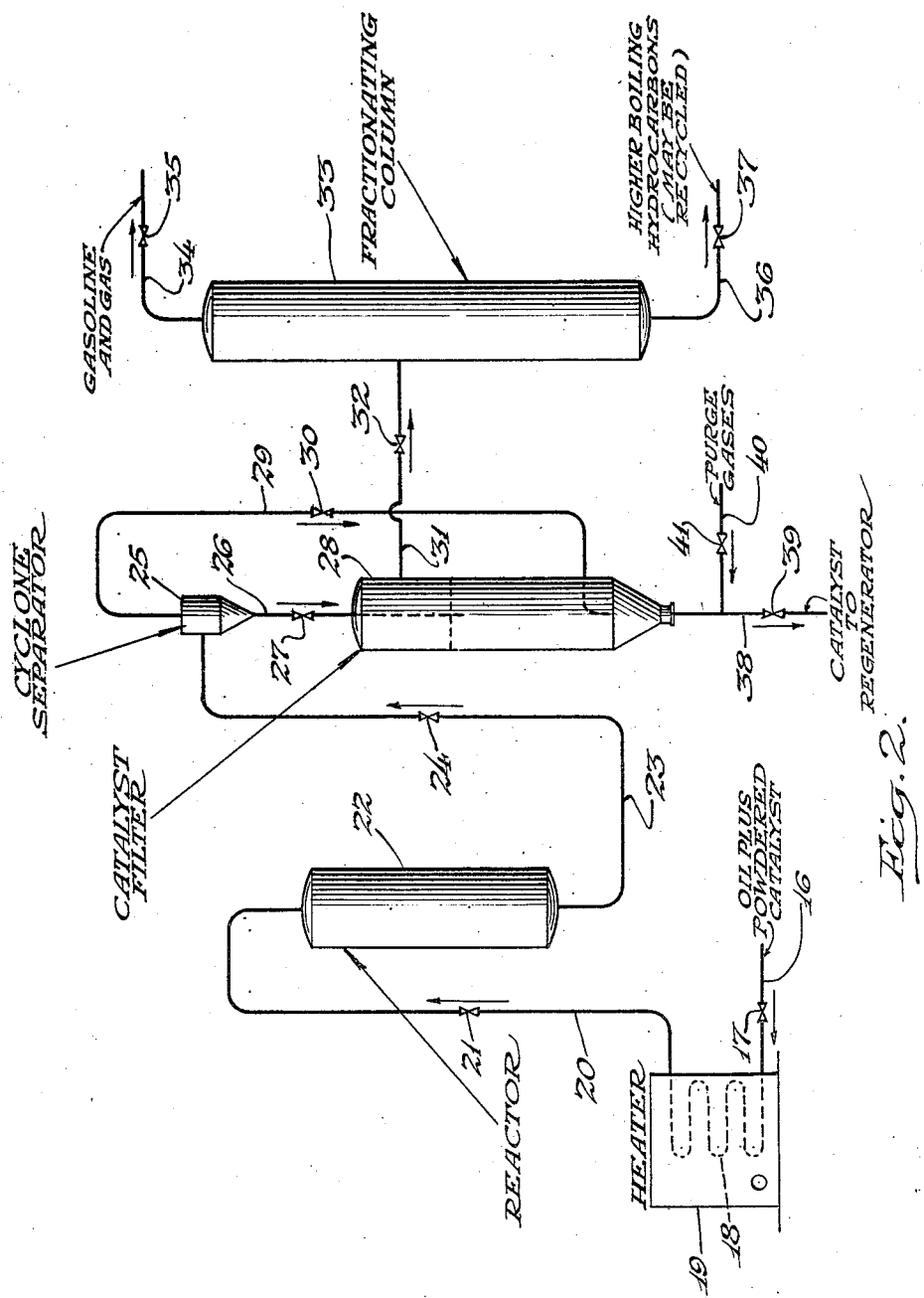

2,400,645

UNITED STATES PATENT OFFICE 2,400,645

SEPARATION OF GASES AND SOLIDS

Lyman C. Huff, Chicago, Ill., assignor to Universal Oil Products Company, Chicago, Ill., a corporation of Delaware Application June 22, 1942, Serial No. 447,975

1 Claim. (Cl. 183—122)

This invention relates broadly to a process wherein a powdered solid is removed from a homogeneous fluid such as a stream of gases or vapors.

More specifically the invention relates to the removal of smaller size particles of powdered solid entrained in a fluid stream by separating out the larger particles and employing them in a bed as a filter medium.

In the catalytic conversion of gaseous reactants in the present of a powdered catalyst, the reaction products contain in suspension a certain quantity of finely divided solid which is difficult to remove and which must be recovered in order to render the process economical. In the reactivation of these same catalysts after contamination during the conversion process, they are subjected to contact with a gaseous regenerating medium, the resulting gaseous products of regeneration containing suspended in them a certain quantity of the finely divided solid which must be recovered.

It has become the practice to remove a certain amount of this finely divided solid by means of cyclone separators wherein the solid is thrown out of the gas or vapor by means of centrifugal force. Cottrell precipitators have also been used for the separation of finely divided powder from a gas or vapor stream. These electrical precipitators have a disadvantage, of course, in that they require expensive electrical energy for their operation.

My invention provides an effective, simple, and continuous method of removing the finely divided solids present in a stream of gaseous or vaporous fluid. In my process, the gaseous stream with the suspended powder is passed through a cyclone separator under such conditions that the larger particles are thrown out of the gaseous stream after which the gaseous stream with the finely divided particles remaining suspended therein is passed through a mass of the larger particles before separated whereby the smaller particles are removed by a filtering action.

In one specific embodiment, my invention comprises a continuous process for separating solid particles entrained in a vaporous fluid stream which comprises maintaining a centrifugal separation zone and a filtration zone, passing said fluid stream and suspended particle through a centrifugal separation zone wherein the larger particles are thrown out of said fluid stream by action of the centrifugal force, transferring the larger particles thus separated to the aforesaid filtration zone, passing the fluid stream leaving the centrifugal separation zone to the filtration zone, and separating the remaining particles suspended in the said fluid stream by the filtering action of the particles separated in the aforesaid centrifugal separation zone.

In order to make the features and advantages of the invention more apparent reference is made to the accompanying diagrammatic drawings.

Figure 2 illustrates the application of my invention to a hydrocarbon conversion process.

Figure 1:
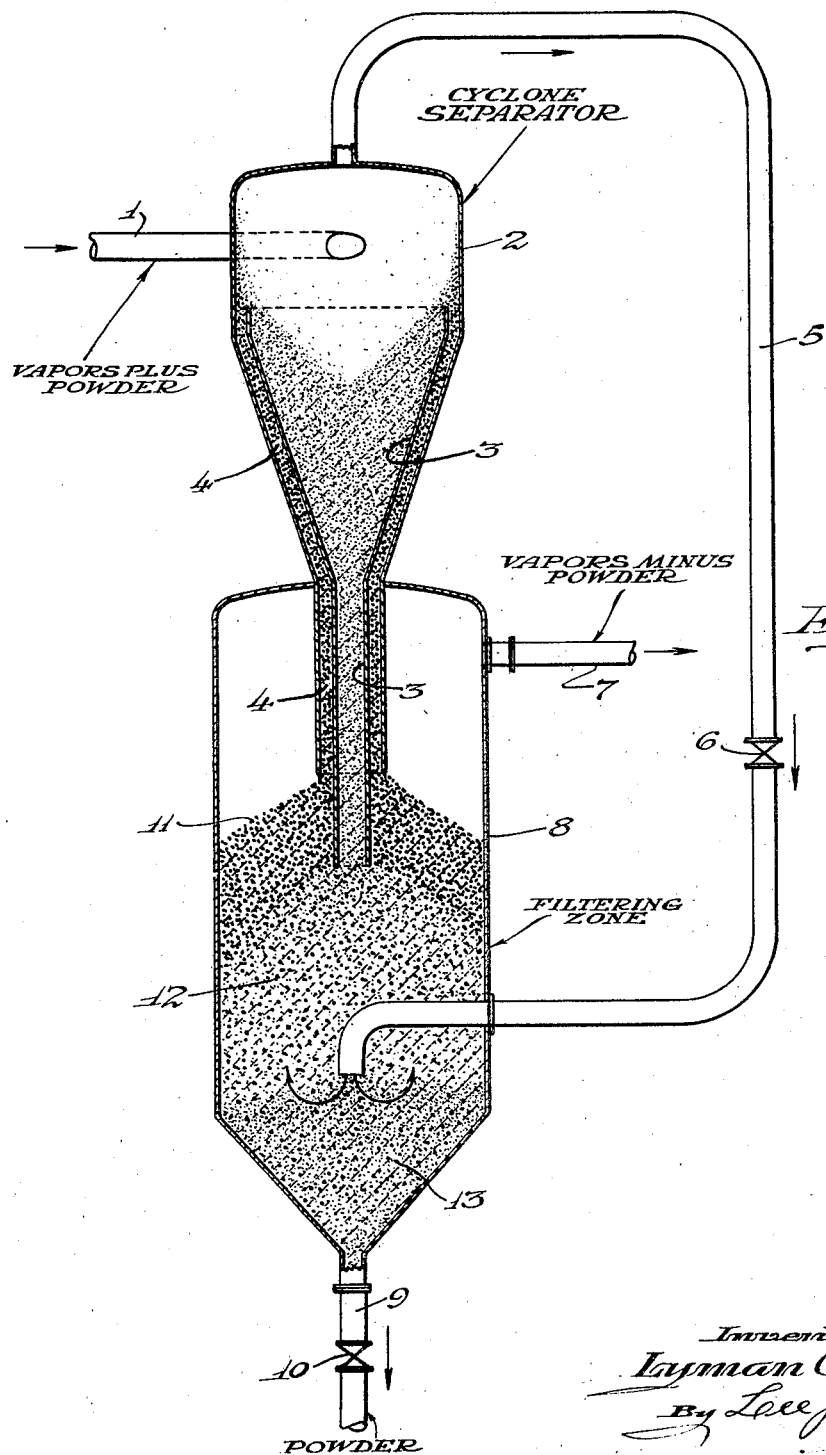
Figure 1 illustrates one form of apparatus and method for conducting the process of my invention.

Referring now to Figure 1, the powder entrained in a stream of gases or vapors in line 1 is directed into cyclone separator 2 wherein the larger particles are thrown out of the gaseous stream by a change in the direction of the path of the vapors. In the particular form of the cyclone separator shown in the drawings, the conical part of the separator together with the down-spout circumscribes an inner member 3 concentric with said conical portion and down-spout so as to form an annular space 4 through which the largest particles flow downwardly after removal from the gaseous stream. Coarse particles somewhat less in diameter than those enclosed within the annular portion flow downwardly within the inner member 3 of the two concentric funnels. The gases from which the larger particles have been removed in the cyclone separator leave the upper portion of said separator to enter line 5 the flow through which is controlled by valve 6. After passing through valve 6 the gases are directed to filtering zone 8, the stream of gases or vapors changing direction flow upwardly through the bed of coarser particles which have been removed in the cyclone separator. The coarser particles thus act as a filtering medium for the removal of the finer particles remaining suspended in the gaseous stream. The gases freed substantially of all of the entrained particles leave the upper portion of the filtering zone to enter conduit 7 from which they are removed from the system. The mixture of large and small particles flows downwardly in the filtering zone to enter conduit 9 from which after passing through valve or other flow control means 10, the powder is removed from the system.

The bed of solid particles contained in the filtering zone 8 is composed of regions having particles of varied size. The upper portion 11 of the bed consists principally of the largest particles that is those which were enclosed within and delivered from the annular zone 4, a middle portion 12 which consists of a mixture of coarse and small particles primarily delivered by funnel 3, while the lowest portion 13 consists of coarse particles with a larger proportion of finer particles than is present in the middle portion of the bed. The average particle size in the lowest portion of the filter bed is, of course, the same as that present in the gas stream entering the cyclone assuming that the separating action is complete and that the vapors leaving by way of conduit 7 are substantially free of entrained powder.

Referring now to Figure 2, the hydrocarbon oil plus the powdered catalyst in suspension is supplied to line 16 wherein after passing through valve 17 it is supplied to heating coil 18. Coil 18 is so disposed as to receive heat from furnace 19, the oil being vaporized within the coil and heated to a temperature which may be within the approximate limits of 800 to 1100° F. with pressures varying from mildly superatmospheric to perhaps 100 pounds per square inch. The heated vapors plus the suspended catalyst leave heating coil 18 to enter line 20 wherein after passing through valve 21 are supplied to an enlarged reaction zone or reactor 22 wherein further cracking takes place. The mixture of reaction products and contaminated catalyst leaves reactor 22 by way of line 23 and after passing through valve 24 enters cyclone separator 25.

In cyclone separator 25 the larger particles are removed from the vaporous stream by means of centrifugal force, the catalyst powder thus separated entering line 26 and after passing through valve 27 is discharged within the catalyst filter 28. The hydrocarbon vapors leaving the cyclone separator 25 contain the smaller particles of powder and enter line 29 wherein after passing through valve 30 the vapors are discharged into the lower portion of filtering zone 28. Upon being discharged from line 29 the catalyst vapors flow upwardly in the filtering zone, passing through the bed of larger particles thereinbefore separated in the cyclone separator, said coarser particles acting as a filtering medium to remove the fine particles remaining suspended in the gaseous stream. The vapors freed from the catalyst leave the upper portion of the filtering zone by way of line 31 and after passing through valve 32 are discharged into fractionating column 33, preferably after being quenched by conventional means not shown.

In fractionating column 33 the gasoline and normally gaseous hydrocarbons are separated from the higher boiling liquids, being removed from the upper portion of the column by way of line 34 controlled by valve 35. In subsequent steps not shown the gasoline is separated from the gas and recovered as a product of the process. The higher boiling hydrocarbons separated from the gasoline and normally gaseous products are removed from the bottom of fractionating column 33 by way of line 36 controlled by valve 37. These higher boiling hydrocarbons may if desired be recycled to the catalytic cracking zone by being returned to line 16.

The contaminated catalyst is removed from filter 28 by way of line 38 and after passing through valve 39 is directed to a regenerator wherein the carbonaceous deposits are removed from the catalyst which may then be reused. These regeneration steps are not shown in the drawing. In order to separate high boiling hydrocarbon vapors adsorbed on the catalyst, purge gases may be introduced into line 38 by means of line 40 controlled by valve 41.

I claim as my invention:

A process for separating solid particles from a stream of vaporous fluid which comprises passing said stream through a separation zone wherein relatively large particles are separated from said stream, classifying said large solid particles as to size and directing the different size particles into different portions of a filter zone in such a manner that the average particle size in said zone decreases from top to bottom and directing said stream of fluid after it leaves the separation zone through said filtering zone in an upward direction in contact with said classified solid particles to effect the removal from said stream of finer solid particles remaining entrained therein.

LYMAN C. HUFF.